United States Patent
Sevindik et al.

(10) Patent No.: US 9,814,060 B1
(45) Date of Patent: Nov. 7, 2017

(54) SYSTEMS AND METHODS FOR SCHEDULING WIRELESS RESOURCES WITH COORDINATED MULTIPOINT TRANMISSIONS

(71) Applicant: Sprint Spectrum LP, Overland Park, KS (US)

(72) Inventors: Volkan Sevindik, Reston, VA (US); Muhammad Ahsan Naim, Sterling, VA (US); Pei Hou, Herndon, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 97 days.

(21) Appl. No.: 14/507,116

(22) Filed: Oct. 6, 2014

(51) Int. Cl.
*H04W 72/12* (2009.01)
*H04B 7/024* (2017.01)

(52) U.S. Cl.
CPC ........ *H04W 72/1231* (2013.01); *H04B 7/024* (2013.01)

(58) Field of Classification Search
CPC .......................... H04W 72/231; H04B 7/024
See application file for complete search history.

(56) References Cited

U.S. PATENT DOCUMENTS

| | | | | |
|---|---|---|---|---|
| 2010/0325515 A1* | 12/2010 | Lohmar | ............... | H04L 1/1874 714/752 |
| 2011/0222428 A1* | 9/2011 | Charbit | ............. | H04B 7/15557 370/252 |
| 2012/0044890 A1* | 2/2012 | Jen | ............................ | H04L 1/18 370/329 |
| 2012/0188953 A1* | 7/2012 | Won | ................. | H04W 72/0406 370/329 |
| 2013/0016686 A1 | 1/2013 | Li et al. | | |
| 2015/0049664 A1* | 2/2015 | Gora | ................... | H04W 84/047 370/315 |
| 2015/0271810 A1* | 9/2015 | Sartori | ..................... | H04L 5/14 370/280 |

* cited by examiner

*Primary Examiner* — Alex Skripnikov
*Assistant Examiner* — Pamit Kaur

(57) ABSTRACT

Systems and methods are described for scheduling wireless resources with coordinated multipoint transmissions. It may be determined that a signal level for a wireless device in communication with an access node does not meet a signal level criteria. Based on the determination, an access node may be instructed to transmit information to the wireless device using a coordinated multipoint transmission. A number of wireless devices in communication with the access node that comprise an application requirement that meets an application requirement criteria may further be determined. Then, the access node may be instructed to schedule wireless transmissions using at least one of semi-persistent scheduling and delay based scheduling based on the determined number of the plurality of wireless devices and the instruction to transmit using the coordinated multipoint transmission.

18 Claims, 6 Drawing Sheets

SYSTEMS AND METHODS FOR SCHEDULING WIRELESS RESOURCES WITH COORDINATED MULTIPOINT TRANMISSIONS

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may experience high load (e.g., load above a threshold) or interference conditions. For example, a communication link may experience a large amount of data traffic or interference conditions may render a communication link less effective, and the efficiency of the system may suffer. Accordingly, a system that effectively balances load and considers interference conditions may be able to provide a high quality service to users of the system.

Overview

Systems and methods are described for scheduling wireless resources with coordinated multipoint transmissions. It may be determined that a signal level for a wireless device in communication with an access node does not meet a signal level criteria. Based on the determination, an access node may be instructed to transmit information to the wireless device using a coordinated multipoint transmission. A number of wireless devices in communication with the access node that comprise an application requirement that meets an application requirement criteria may further be determined. Then, the access node may be instructed to schedule wireless transmissions using at least one of semi-persistent scheduling and delay based scheduling based on the determined number of the plurality of wireless devices and the instruction to transmit using the coordinated multipoint transmission.

DETAILED DESCRIPTION

Figure 1:
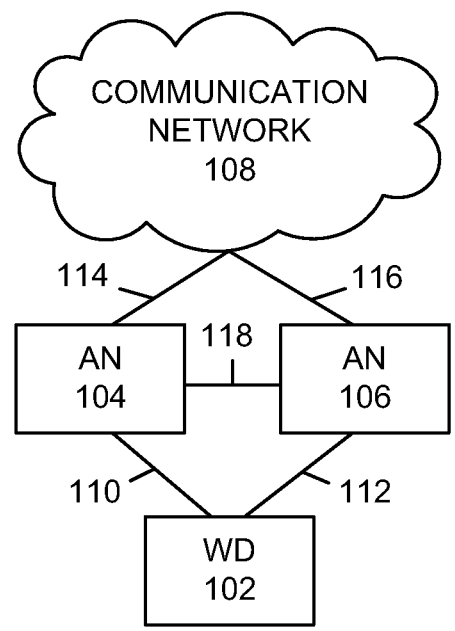
FIG. 1 illustrates an exemplary communication system to schedule wireless resources with coordinated multipoint transmissions.

FIG. 1 illustrates an exemplary communication system 100 to schedule wireless resources with coordinated multipoint transmissions comprising wireless devices 102, access nodes 104 and 106, communication network 108, and communication links 110, 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 104 and 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and can be, for example, a base transceiver station, a radio base station, and an eNodeB device. Access nodes 104 and 106 may communicate with communication network 108 over communication links 114 and 116 respectively. Access nodes 104 and 106 may also communicate directly with each other over communication link 118.

Although only access nodes 104 and 106 are illustrated in FIG. 1, wireless device 102 (and other wireless device not depicted) can be in communication with a plurality of access nodes and/or small cells. The plurality of access nodes and/or small cells can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116, and 118, can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
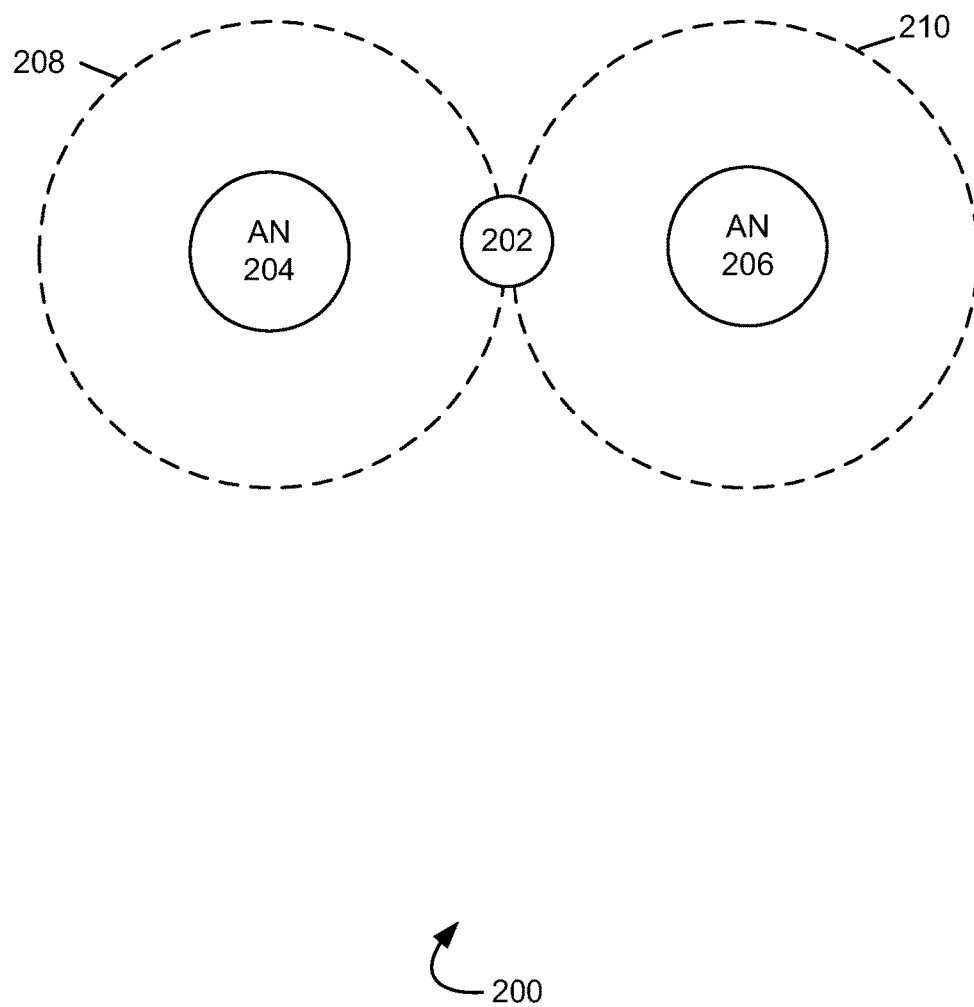
FIG. 2 illustrates another exemplary system to schedule wireless resources with coordinated multipoint transmissions.

FIG. 2 illustrates an exemplary communication system 200 for scheduling wireless resources with coordinated multipoint transmissions. System 200 comprises wireless device 202, and access nodes 204 and 206, and signal areas 208 and 210. Wireless device 202 may comprise a device similar to wireless device 102. Access nodes 204 and 206 may comprise access nodes similar to access nodes 104 and 106.

In operation, access node 204 may establish communication with wireless device 202 such that access node 204 provides the wireless device access to a communication network (e.g., communication network 110). Signal areas 208 and 210 may comprise areas around each of access nodes 204 and 206 where a wireless device may detect wireless signals transmitted from the access node at a signal level above a threshold. For example, signal areas 208 and 210 may comprise coverage areas for access nodes 204 and 206 respectively, such that wireless devices that fall within the signal areas are provided wireless resources by the respective access node.

In an embodiment, system 200 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, system 200 may leverage coordinated multipoint transmissions to enhance data transmission to wireless device 202. For example, wireless device 202 may be located at the edge of signal area 208. Accordingly, the wireless device may comprise a low channel quality (e.g., a channel quality indicator (CQI) below a threshold). The low channel quality may be based on a high interference level for the signals received by wireless device 202 from access node 204, and this may limit the data rate for transmissions between access node 204 and wireless device 202.

In an embodiment, system 200 may use a coordinated multipoint transmission to provide enhanced service to wireless device 202. Access nodes 204 and 206 may coordinate when communicating with wireless device 202. For example, access node 204 may transmit data to wireless device 202 using a particular frequency band and/or during a particular transmission time, and access node 206 may actively refrain from transmitting signals over the particular frequency band and/or during the particular transmission time such that the interference experienced by wireless device 202 may be reduced. In another example, access nodes 204 and 206 may each transmit signals to wireless device 202, where at least a portion of the signals comprise redundant data, such that wireless device 202 may achieve a higher data rate when receiving transmissions.

In an embodiment, such coordinated multipoint transmissions may be scheduled from access node 204 using a scheduler with high scheduling granularity (e.g., greater than a default scheduling granularity). However, scheduling wireless resources at access node 204 may also be based on other factors, such as application requirements for other wireless devices communicating with the access node and mobility for other wireless devices communicating with the access node. Accordingly, an access node that considers multiple factors when scheduling wireless resources with coordinated multipoint transmissions may enhance service for wireless devices in communication with the access node.

Systems and methods are described for scheduling wireless resources with coordinated multipoint transmissions. It may be determined that a signal level for a wireless device in communication with an access node does not meet a signal level criteria. Based on the determination, an access node may be instructed to transmit information to the wireless device using a coordinated multipoint transmission. A number of wireless devices in communication with the access node that comprise an application requirement that meets an application requirement criteria may further be determined. Then, the access node may be instructed to schedule wireless transmissions using at least one of semi-persistent scheduling and delay based scheduling based on the determined number of the plurality of wireless devices and the instruction to transmit using the coordinated multipoint transmission.

Figure 3:
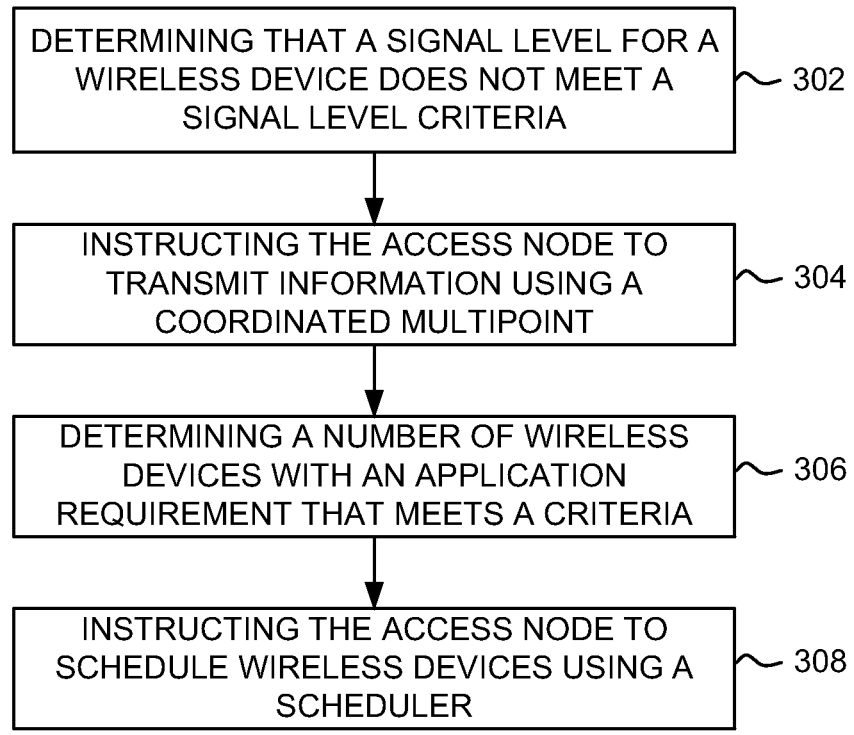
FIG. 3 illustrates an exemplary method of scheduling wireless resources with coordinated multipoint transmissions.

FIG. 3 illustrates an exemplary method for scheduling wireless resources with coordinated multipoint transmissions. The method will be discussed with reference to the exemplary communication system 200 illustrated in FIG. 2, however, the method can be implemented with any suitable communication system.

Referring to FIG. 3, at step 302, it may be determined that a signal level for a wireless device in communication with an access node does not meet a signal level criteria. For example, wireless device 202 may comprise a channel quality indicator (e.g., CQI) that indicates the signal level for a signal received at wireless device 202 from access node 204. The CQI may be based on signal level (e.g., signal to noise plus interference ration, SINR) for a reference signal received at wireless device 202 from access node 204. In an embodiment, the signal level (e.g., CQI) may be compared to a signal level criteria (e.g., signal level threshold). In an example, wireless device 202 may experience interference and it may be determined that the signal level (e.g., CQI) for wireless device 202 does not meet the signal level criteria (e.g., threshold).

At step 304, the access node may be instructed to transmit information to the wireless device using a coordinated multipoint transmission. For example, access node 204 may be instructed to transmit information to wireless device 202 using a coordinated multipoint transmission. In this example, access nodes 204 and 206 may coordinate when information is being transmitted to wireless device 202. For instance, access nodes 204 and 206 may each transmit signals to wireless device 202, where at least a portion of the signals comprise redundant data, such that wireless device 202 may achieve a higher signal level when receiving coordinated multipoint transmissions.

At step 306, a number of a plurality of wireless devices in communication with the access node that comprise an application requirement that meets an application requirement criteria may be determined. For example, a number of a plurality of wireless devices in communication with access node 204 that comprise an application requirement that meets an application requirement criteria (e.g., threshold) may be determined.

An application requirement, or a quality of service (QoS) requirement, may be one or more service conditions that a wireless device requests from an access node, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. In an embodiment, the plurality of wireless device in communication with access node 204 may comprise a quality of service class identifier (QCI). A number of wireless devices in communication with access node 204 that comprises a QCI that meets an application requirement criteria (e.g., QCI threshold) may be determined.

At step 308, the access node may be instructed to schedule wireless transmissions using at least one of semi-persistent scheduling and delay based scheduling based on the determined number of the plurality of wireless devices and the instruction to transmit using the coordinated multipoint transmission. For example, access node 204 may be instructed to schedule wireless transmissions using at least one of semi-persistent scheduling and delay based scheduling based on the determined number of the wireless devices and the instruction to transmit using the coordinated multipoint transmission. In an embodiment, where the determined number of the plurality of wireless devices meets a threshold (e.g., minimum absolute number, minimum percentage number, and the like) and access node 204 is instructed to transmit using the coordinated multipoint transmission, access node 204 may schedule wireless resources using semi-persistent scheduling, delay based scheduling, or a combination of these.

Figure 4:
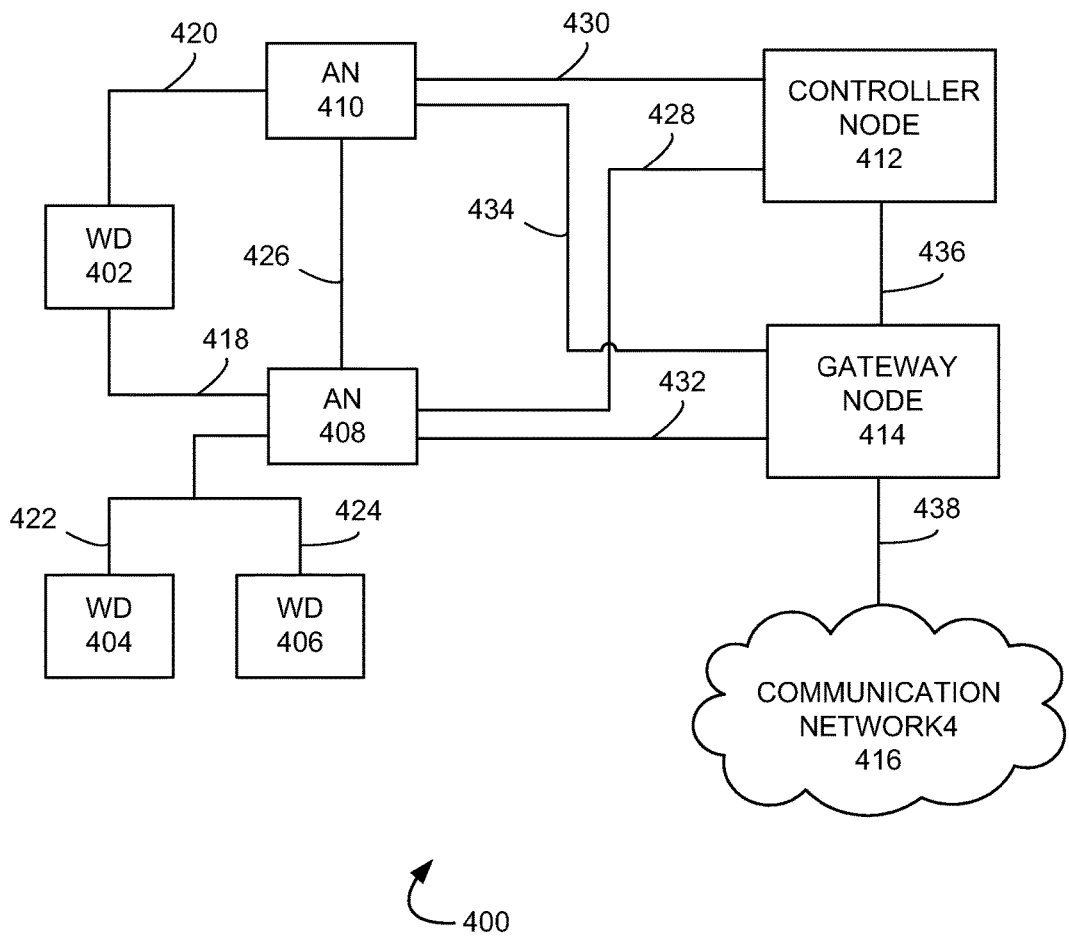
FIG. 4 illustrates another exemplary system to schedule wireless resources with coordinated multipoint transmissions.

FIG. 4 illustrates another exemplary communication system 400 to schedule wireless resources with coordinated multipoint transmissions. Communication system 400 may comprise wireless devices 402, 404 and 406, access nodes 408 and 410, controller node 412, gateway node 414, communication network 416, and communication links 418, 420, 422, 424, 426, 428, 430, 432, 434, 436, and 438. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402, 404, and 406 can be any device configured to communicate over communication system 400 using a wireless communication link. For example, wireless devices 402, 404, and 406 can include a cell phone, a smart phone, a computing platform such as a laptop, palmtop, or a tablet, a personal digital assistant, or an internet access device, and combinations thereof.

Access nodes 408 and 410 are network nodes capable of providing wireless communications to wireless devices 402, 404, and 406, and can be, for example, a base transceiver station, a radio base station, or an eNodeB device. In an embodiment, access node 408 can comprise a serving access node for wireless device 402, 404, and 406. Access nodes 408 and 410 may communicate with controller node 412 over communication links 428 and 430, respectively, and with gateway node 414 over communication links 432 and 434, respectively. Access nodes 408 and 410 may also communicate directly with each other over communication link 426.

Controller node 412 can be any network node configured to manage services within system 400. Controller node 412 may provide other control and management functions for system 400. The controller node 412 can be a single device having various functions or a plurality of devices having differing functions. For example, controller node 412 can include at least one of a multi-cell/multicast coordination entity (MCE), a mobility management entity (MME), a radio network controller (RNC), a mobile switching center (MSC), and a combination thereof.

Controller node 412 can comprise a processor and associated circuitry to execute or direct the execution of computer-readable instructions to obtain information. Controller node 412 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 412 can receive instructions and other input at a user interface. Controller node 412 can comprise a processor and associated circuitry to execute or direct the execution of computer-readable instructions to obtain information.

Gateway node 414 is a network element which can comprise a processor and associated circuitry to execute or direct the execution of computer-readable instructions. Gateway node 414 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 414 can provide instructions to access nodes 408 and 410 related to channel selection in communications with wireless devices 402, 404, and 406. For example, gateway node 414 can comprise at least one of a serving gateway (SGW), a packet data network gateway (PDNGW), a cellular gateway (CGW), and a combination thereof.

Communication network 416 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 416 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 416 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 418, 420, 422, 424, 426, 428, 430, 432, 434, 436, and 438 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 408 and 410, controller node 412, gateway node 414, and communication network 416 which are omitted for clarity, including additional processing nodes, routers, gateways, and physical and/or wireless data links for carrying data among the various network elements. In an embodiment, any of controller node 412, gateway node 414, and one or more modules of access nodes 408 and/or 410 may perform all or parts of the methods of FIGS. 3 and 5.

In operation, access node 408 may establish communication with wireless devices 402, 4040, and 406 such that access node 408 provides the wireless devices access to a communication network (e.g., communication network 416). In an embodiment, system 400 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, system 400 may leverage coordinated multipoint transmissions to enhance data transmission to wireless device 402. For example, wireless device 402 may be located at the edge of a signal area for access node 408. Accordingly, the wireless device may comprise a low channel quality (e.g., a channel quality indicator (CQI) below a threshold). The low channel quality may be based on a high interference level for the signals received by wireless device 402 from access node 408, and this may limit the data rate for transmissions between access node 408 and wireless device 402.

In an embodiment, system 400 may use a coordinated multipoint transmission to provide enhanced service to wireless device 402. Access nodes 408 and 410 may coordinate when communicating with wireless device 402. For example, access node 408 may transmit data to wireless device 402 using a particular frequency band and/or during a particular transmission time, and access node 410 may actively refrain from transmitting signals over the particular frequency band and/or during the particular transmission time such that the interference experienced by wireless device 402 may be reduced. In another example, access nodes 408 and 410 may each transmit signals to wireless device 402, where at least a portion of the signals comprise redundant data, such that wireless device 402 may achieve a higher data rate when receiving transmissions.

In an embodiment, such coordinated multipoint transmissions may be scheduled from access node 408 using a scheduler with high scheduling granularity (e.g., greater than a default scheduling granularity). However, scheduling wireless resources at access node 408 may also be based on other factors, such as application requirements for other wireless devices communicating with the access node (e.g., wireless devices 404 and 406) and mobility for other wireless devices communicating with the access node (e.g., wireless devices 404 and 406). Accordingly, an access node that considers multiple factors when scheduling wireless resources with coordinated multipoint transmissions may enhance service for wireless devices in communication with the access node.

Systems and methods are described for scheduling wireless resources with coordinated multipoint transmissions. It may be determined that a signal level for a wireless device in communication with an access node does not meet a signal level criteria. Based on the determination, an access node may be instructed to transmit information to the wireless device using a coordinated multipoint transmission. A number of wireless devices in communication with the access node that comprise an application requirement that meets an application requirement criteria may further be determined. Then, the access node may be instructed to schedule wireless transmissions using at least one of semi-persistent scheduling and delay based scheduling based on the determined number of the plurality of wireless devices and the instruction to transmit using the coordinated multipoint transmission.

Figure 5:
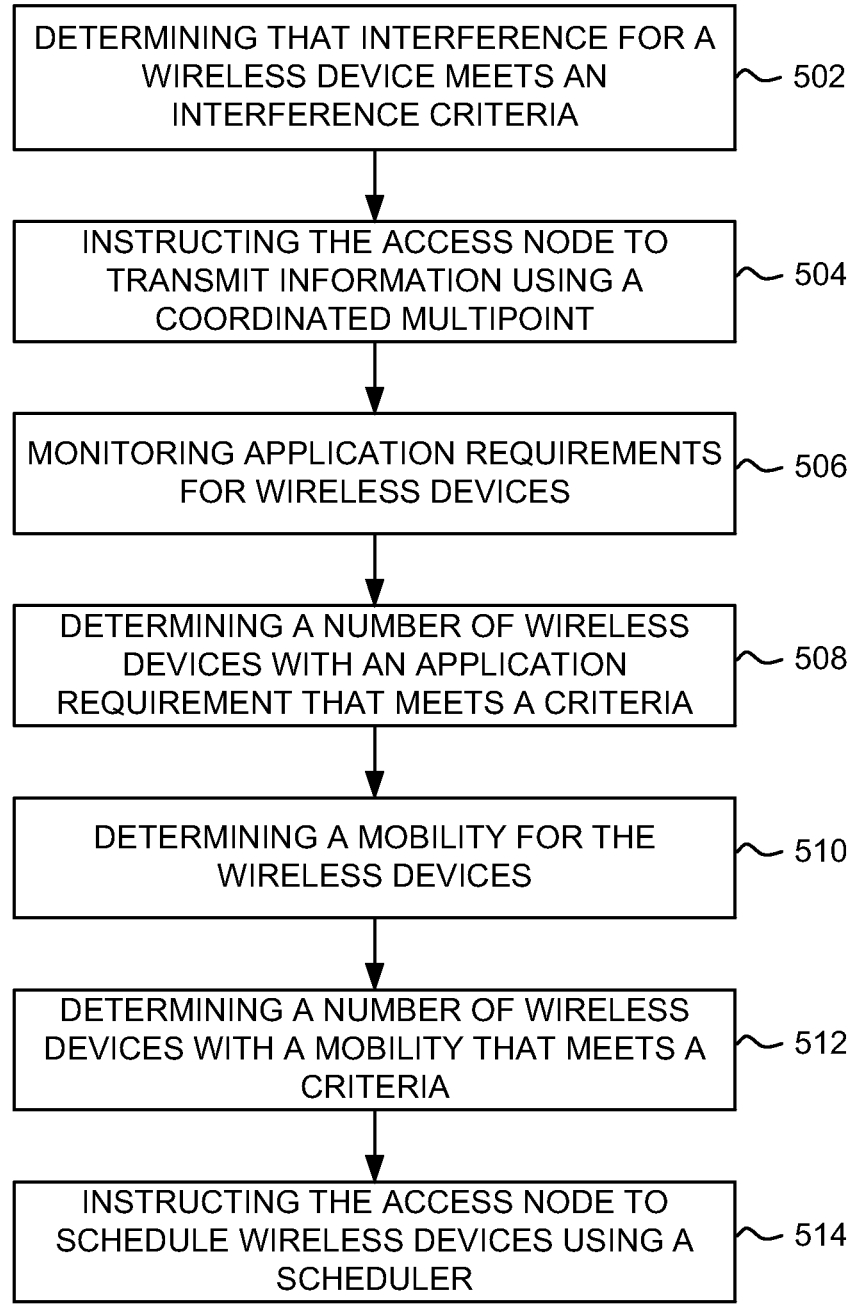
FIG. 5 illustrates another exemplary method of scheduling wireless resources with coordinated multipoint transmissions.

FIG. 5 illustrates an exemplary method for scheduling wireless resources with coordinated multipoint transmissions. The method will be discussed with reference to the exemplary communication system 400 illustrated in FIG. 4, however, the method can be implemented with any suitable communication system.

Referring to FIG. 5, at step 502, it may be determined that a signal level for a wireless device in communication with an access node does not meet a signal level criteria. For example, wireless device 402 may comprise a channel quality indicator (e.g., CQI) that indicates the signal level for a signal received from access node 408.

The CQI may be based on signal level (e.g., signal to noise plus interference ration, SINR) for a reference signal received at wireless device 402 from access node 408. In an embodiment, the signal level (e.g., CQI) may be compared to a signal level criteria (e.g., signal level threshold). In an example, wireless device 402 may experience interference and it may be determined that the signal level (e.g., CQI) for wireless device 402 does not meet the signal level criteria (e.g., threshold).

At step 504, the access node may be instructed to transmit information to the wireless device using a coordinated multipoint transmission. For example, access node 408 may be instructed to transmit information to wireless device 402 using a coordinated multipoint transmission based on the signal level for the wireless device not meeting the signal level criteria. In this example, access nodes 408 and 410 may coordinate when information is being transmitted to wireless device 402. For instance, access nodes 408 and 410 may each transmit signals to wireless device 402, where at least a portion of the signals comprise redundant data, such that wireless device 402 may achieve a higher signal level when receiving coordinated multipoint transmissions.

In an embodiment, access node 408 may be instructed to transmit information to wireless device 402 using a coordinated multipoint transmission based on the signal level for the wireless device not meeting the signal level criteria and a timing advance for the wireless device being above a threshold. For example, a timing advance for a wireless device may be used to mitigate against propagation delay caused by distance from the source access node or other interference conditions. Accordingly, a timing advance above a threshold for a wireless device may indicate a threshold distance from the source access node. In an embodiment, access node 408 may be instructed to transmit information to wireless device 402 using a coordinated multipoint transmission based on the signal level for wireless device 402 not meeting the signal level criteria and the timing advance for wireless device 402 being above a threshold.

At step 506, application requirements for wireless devices in communication with the access node may be monitored. For example, application requirements, such as QCIs, for wireless devices in communication with access node 408 (e.g, wireless devices 402, 404, and 406) may be monitored. The application requirements may comprise one or more QCIs for each of wireless devices 402, 404, and 406, and each application requirement may be monitored.

At step 508, a number of a plurality of wireless devices in communication with the access node that comprise an application requirement that meets an application requirement criteria may be determined. For example, a number of a plurality of wireless devices in communication with access node 408 (e.g., wireless devices 402, 404, and 406) that comprise an application requirement that meets an application requirement criteria (e.g., threshold) may be determined. In an embodiment, the plurality of wireless device in communication with access node 408 may comprise a quality of service class identifier (QCI). A number of wireless devices in communication with access node 408 that comprises a QCI that meets an application requirement criteria (e.g., QCI threshold) may be determined.

For example, the application requirement criteria may comprise a subset of QCIs, such as QCIs that comprise guaranteed bit rates, guaranteed bit rates above a threshold, and the like (e.g., one or more of QCIs 2, 3, 4, and 5). In another example, the application requirement may comprise a subset of QCIs that may be used to provide voice service to a wireless device. Accordingly, a number of wireless devices in communication with access node 408 that comprises a QCI that meets an application requirement criteria (e.g., a QCI with a guaranteed bit rate greater than a threshold, a QCI that may be used to provide voice services to a wireless device, and the like) may be determined.

At step 510, a mobility for wireless devices in communication with the access node may be monitored. For example, a mobility for wireless devices in communication with access node 408 (e.g., wireless devices 402, 404, and 406) may be monitored. The mobility may be monitored based on tracked signal levels detected at the wireless devices (e.g., detected reference signal levels from access nodes compared over a period of time), a reported mobility for the wireless devices, a global position system (GPS), and any other suitable method. For example, the mobility may comprise a distance traveled for the wireless device, a wireless connection history (e.g., connections to access nodes), a device profile, an acceleration for the wireless device (e.g., an acceleration over a period of time, a number of times the wireless device exceeded a threshold acceleration, and the like), a history of signals received (e.g., at a received signal level) from a plurality of access nodes over a period of time, and the like.

At step 512, a second number of a plurality of wireless devices in communication with the access node that comprise a mobility that meets a mobility criteria may be determined. For example, a second number of a plurality of wireless devices in communication with access node 408 (e.g., wireless devices 402, 404, and 406) that comprise a mobility that meets mobility criteria (e.g., threshold) may be determined.

In an embodiment, the monitored mobility for the wireless devices may comprise a distance covered, a wireless connection history (e.g., number of access nodes that the wireless device was connected to over a period of time, such a cell reselection number), or a device profile. In this example, the mobility criteria may comprise a threshold distance, a threshold number of access nodes that the wireless device connected to (e.g., cell reselection), or a criteria for the device profile. Accordingly, a second number of wireless devices in communication with access node 408 that comprises a mobility (e.g., distance covered, number of cell reselections, device profile, and the like) that meets the mobility criteria (e.g., threshold distance, threshold number of cell reselections, and the like) may be determined. In an embodiment, the wireless devices that comprise a mobility that meets the mobility criteria may comprise highly mobile wireless devices.

At step 514, the access node may be instructed to schedule wireless transmissions using at least one of semi-persistent scheduling and delay based scheduling based on the determined first number of the plurality of wireless devices and the instruction to transmit using the coordinated multipoint transmission. For example, access node 408 may be instructed to schedule wireless transmissions using at least one of semi-persistent scheduling and delay based scheduling based on the determined first number of the wireless devices and the instruction to transmit using the coordinated multipoint transmission.

In an embodiment, semi-persistent scheduling may schedule wireless resources (e.g., bandwidth, physical resources blocks, and the like) to wireless devices in a semi-persistent manner. For example, bandwidth may be scheduled to a wireless device (e.g., based on a QCI for the wireless device) for a semi-persistent duration (e.g., over a limited period of time). Once scheduled, a physical resource block (PRB) and transmission time interval (TTI) combination may be reserved for a particular wireless device for a period of time (e.g., duration of a call). Based on the semi-persistent duration of the scheduling, the scheduler may achieve a moderate level of scheduling granularity. Delay based scheduling may schedule wireless resources (e.g., physical resources blocks) without a semi-persistent duration. For example, delay based scheduling may schedule wireless resources based on a delay budget for packets received at the scheduler. Accordingly, once scheduled, a PRB and TTI combination may not be reserved for a particular wireless device during a period of time (e.g., during a call), and the delay based scheduler may exercise more control over the wireless resources being scheduled. Because the wireless resources are not semi-persistent, delay based scheduling may achiever a greater level of scheduling granularity than semi-persistent scheduling. In this example, delay based scheduling may comprise a higher scheduling overhead than semi-persistent scheduling. In an embodiment, delay based scheduling may be used to schedule coordinated multipoint transmissions due to the greater scheduling granularity.

In an embodiment, where the determined first number of the plurality of wireless devices meets a threshold (e.g., minimum absolute number, minimum percentage number, and the like) and access node 408 is instructed to transmit using the coordinated multipoint transmission, access node 408 may schedule wireless resources using semi-persistent scheduling for a first percentage of wireless resources (e.g., PRBs), and delay based scheduling for a second percentage of wireless resources (e.g., PRBs). In this example, the coordinated multipoint transmissions may leverage delay based scheduling in order to achieve a certain scheduling granularity while transmissions for other traffic (e.g., QCI 1 traffic that request a guaranteed bit rate above a threshold) may leverage the lower scheduling overhead for semi-persistent scheduling. The threshold may comprise a minimum number of wireless devices, a minimum percentage of wireless devices (e.g., percentage based on the number of wireless devices in communication with access node 408), and any other suitable threshold.

In an embodiment, where the determined first number of the plurality of wireless devices does not meet the threshold (e.g., minimum absolute number, minimum percentage number, and the like) and access node 408 is instructed to transmit using the coordinated multipoint transmission, access node 408 may schedule wireless resources using delay based scheduling. In this example, the coordinated multipoint transmissions may leverage delay based scheduling in order to achieve a certain scheduling granularity.

In an embodiment, the scheduling may be based on the determined first number of the plurality of wireless devices, the instruction to access node 408 to transmit using the coordinated multipoint transmission, and the monitored application requirements for the wireless device in communication with access node 408. Here, access node 408 may schedule wireless resources using semi-persistent scheduling for a first percentage of wireless resources (e.g., PRBs), and delay based scheduling for a second percentage of wireless resources (e.g., PRBs). For example, where the number of monitored application requirements that comprise guaranteed bit rate requests (e.g., QCIs with a guaranteed bit rate) increases, the first percentage of wireless resources may be increased and the second percentage of wireless resources may be decreased. In another example, where the number of monitored application requirements that comprise non-guaranteed bit rate requests (e.g., QCIs with a non-guaranteed bit rate) increases, the first percentage of wireless resources may be decreased and the second percentage of wireless resources may be increased.

In an embodiment, where the determined first number of the plurality of wireless devices meets a first threshold (e.g., minimum absolute number, minimum percentage number, and the like), the determined second number of the plurality of wireless devices meets a second threshold (e.g., minimum absolute number, minimum percentage number, and the like) and access node 408 is instructed to transmit using the coordinated multipoint transmission, access node 408 may schedule wireless resources using semi-persistent scheduling for a first percentage of wireless resources (e.g., PRB), and delay based scheduling for a second percentage of wireless resources (e.g., PRB). In this example, the first number may comprise the number of wireless devices in communication with access node 408 that comprise an application requirement that meets an application requirement criteria and the second number may comprise the number of wireless devices in communication with access node 408 that comprise a mobility that meets a mobility criteria.

In an embodiment, the coordinated multipoint transmissions may leverage delay based scheduling in order to achieve a certain scheduling granularity while transmissions for other traffic (e.g., QCI 1 traffic that request a guaranteed bit rate above a threshold, traffic for highly mobile wireless devices) may leverage the lower scheduling overhead for semi-persistent scheduling. The first threshold and second threshold may comprise a minimum number of wireless devices, a minimum percentage of wireless devices (e.g., percentage based on the number of wireless devices in communication with access node 408), and any other suitable threshold. In an embodiment, the first percentage of wireless resources increases and the second percentage of wireless resources decreases when the determined second number of wireless devices increases. In this example, the first percentage of wireless resources decreases and the second percentage of wireless resources increases when the determined second number of wireless devices decreases.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 6:
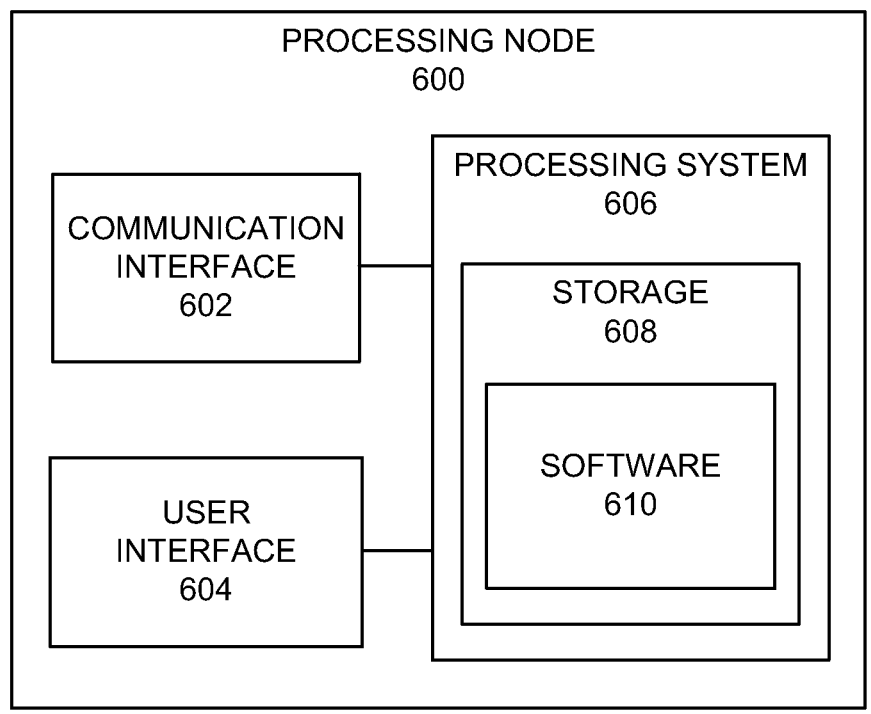
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 412 and gateway node 414. Processing node 600 can also be an adjunct or component of a network element, such as an element of access nodes 106 or 408 and the like. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for scheduling wireless resources with coordinated multipoint transmissions, the method comprising:
   determining that a signal level for a wireless device in communication with an access node does not meet a signal level criteria;
   instructing the access node, based on the determination that the signal level does not meet the signal level criteria, to transmit information to the wireless device using a coordinated multipoint transmission;
   determining a number of a plurality wireless devices in communication with the access node that comprise an application requirement that meets an application requirement criteria; and
   instructing the access node to schedule wireless transmissions using semi-persistent scheduling and delay based scheduling based on the determined number of the plurality of wireless devices and the instruction to transmit using the coordinated multipoint transmission, wherein the access node is instructed to schedule wireless transmissions using semi-persistent scheduling for a first percentage of resources and using delay based scheduling for a second percentage of resources.

2. The method of claim 1, further comprising:
   instructing the access node to schedule wireless transmissions using delay based scheduling when the determined number of the plurality of wireless devices does not meet a threshold criteria.

3. The method of claim 1, further comprising:
   monitoring the application requirements for the plurality of wireless devices; and
   instructing the access node to schedule wireless transmissions using delay based scheduling based on the determined number of the plurality of wireless devices, the instruction to transmit using the coordinated multipoint transmission, and the monitored application requirements.

4. The method of claim 1, wherein the application requirement criteria comprises a guaranteed bit rate above a threshold bit rate.

5. The method of claim 1, further comprising:
   determining a mobility for the plurality of wireless devices; and
   instructing the access node to schedule wireless transmissions using at least one of semi-persistent scheduling and delay based scheduling based on the determined number of the plurality of wireless devices, the instruction to transmit using the coordinated multipoint transmission, and the determined mobility.

6. The method of claim 5, further comprising:
   determining a second number of the plurality wireless devices that comprise a mobility that meets a mobility criteria, wherein the first percentage of resources and the second percentage of resources are based on the determined second number.

7. The method of claim 6, wherein the first percentage of wireless resources increases and the second percentage of wireless resources decreases when the determined second number of wireless devices increases.

8. The method of claim 1, wherein the delay based scheduling comprises a scheduling granularity greater than the semi-persistent scheduling.

9. The method of claim 8, wherein the delay based scheduling comprises a scheduling overhead that is greater than the semi-persistent scheduling.

10. The method of claim 1, wherein the wireless device that receives the coordinated multipoint transmission receives at least two signals such that least a portion of the two signals comprise redundant data.

11. A system for scheduling wireless resources with coordinated multipoint transmissions, the system comprising:
    a processing node comprising a processor configured to:
       determine that a signal level for a wireless device in communication with an access node does not meet a signal level criteria;
       instruct the access node, based on the determination that the signal level does not meet the signal level criteria, to transmit information to the wireless device using a coordinated multipoint transmission;
       determine a number of a plurality wireless devices in communication with the access node that comprise an application requirement that meets an application requirement criteria; and
       instruct the access node to schedule wireless transmissions using semi-persistent scheduling and delay based scheduling based on the determined number of the plurality of wireless devices and the instruction to transmit using the coordinated multipoint transmission, wherein the access node is instructed to schedule wireless transmissions using semi-persistent scheduling for a first percentage of resources and using delay based scheduling for a second percentage of resources.

12. The system of claim 11, wherein the processing node is further configured to:
    instructing the access node to schedule wireless transmissions using delay based scheduling when the determined number of the plurality of wireless devices meets a threshold criteria.

13. The system of claim 11, wherein the processing node is further configured to:
    monitoring the application requirements for the plurality of wireless devices; and
    instructing the access node to schedule wireless transmissions using delay based scheduling based on the determined number of the plurality of wireless devices, the instruction to transmit using the coordinated multipoint transmission, and the monitored application requirements.

14. The system of claim 11, wherein the application requirement criteria comprises a guaranteed bit rate above a threshold bit rate.

15. The system of claim 11, wherein the processing node is further configured to:
- determining a mobility for the plurality of wireless devices; and
- instructing the access node to schedule wireless transmissions using at least one of semi-persistent scheduling and delay based scheduling based on the determined number of the plurality of wireless devices, the instruction to transmit using the coordinated multipoint transmission, and the determined mobility.

16. The system of claim 15, wherein the processing node is further configured to:
- determining a second number of the plurality wireless devices that comprise a mobility that meets a mobility criteria, wherein the first percentage of resources and the second percentage of resources are based on the determined second number.

17. The system of claim 16, wherein the first percentage of wireless resources increases and the second percentage of wireless resources decreases when the determined second number of wireless devices increases.

18. The system of claim 11, wherein the delay based scheduling comprises at least one of a scheduling granularity greater than the semi-persistent scheduling and scheduling overhead that is greater than the semi-persistent scheduling.

\* \* \* \* \*